(12) United States Patent
Lai et al.

(10) Patent No.: US 12,487,172 B2
(45) Date of Patent: Dec. 2, 2025

(54) FOURIER TRANSFORM SPECTROMETER APPLICABLE IN AN ARRAY OF COHERENT LIGHT SOURCES

(71) Applicants: Tsinghua University, Beijing (CN); HON HAI PRECISION INDUSTRY CO., LTD., New Taipei (TW)

(72) Inventors: Li-Wen Lai, Beijing (CN); Peng Liu, Beijing (CN); Duan-Liang Zhou, Beijing (CN); Qun-Qing Li, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 212 days.

(21) Appl. No.: 18/231,809

(22) Filed: Aug. 9, 2023

(65) Prior Publication Data

US 2024/0053260 A1 Feb. 15, 2024

(30) Foreign Application Priority Data

Aug. 15, 2022 (CN) .......................... 202210981496.X

(51) Int. Cl.
*G01N 21/35* (2014.01)
(52) U.S. Cl.
CPC ..... *G01N 21/35* (2013.01); *G01N 2021/3595* (2013.01); *G01N 2201/06113* (2013.01)
(58) Field of Classification Search
CPC ..................................................... G01N 21/35
See application file for complete search history.

(56) References Cited

U.S. PATENT DOCUMENTS

| 5,351,121 A * | 9/1994 | Baer .......................... G01J 3/44 |
| | | 356/301 |
| 9,061,899 B2 | 6/2015 | Rowe et al. |
| 2022/0121080 A1* | 4/2022 | Yao ........................... G02F 1/31 |
| 2023/0108409 A1* | 4/2023 | Deliwala ............ G01N 21/8851 |
| | | 382/128 |

FOREIGN PATENT DOCUMENTS

| CN | 211978137 | 11/2020 |
| CN | 113566983 | 10/2021 |
| JP | 201247696 | 3/2012 |
| JP | 2016525802 | 8/2016 |

* cited by examiner

*Primary Examiner* — Hugh Maupin
(74) *Attorney, Agent, or Firm* — ScienBiziP, P.C.

(57) ABSTRACT

The present invention relates to a Fourier transform spectrometer applicable in an array of coherent light sources, comprising: a light source, a light transmission device, a control circuit, a detector, an amplifying circuit, and a computer. The control circuit is electrically connected to the light transmission device for control the on-off of light in the light transmission device. The amplifying circuit is connected with the detector for recording and amplifying the photoelectric signal obtained by the detector. The computer is connected with the amplifying circuit. The computer is equipped with a spectral analysis software is used to perform Fourier transform. The Fourier transform spectrometer based on the coherent light source array further includes a coherent light source array. The light transmission device is used to transmit the light emitted by the light source to the coherent light source array.

7 Claims, 2 Drawing Sheets

FOURIER TRANSFORM SPECTROMETER APPLICABLE IN AN ARRAY OF COHERENT LIGHT SOURCES

CROSS-REFERENCE TO RELATED APPLICATIONS

This application claims all benefits under 35 U.S.C. § 119 from the Chinese Patent Application No. 202210981496.X, filed on Aug. 15, 2022, in the China National Intellectual Property Administration, the disclosure of which is incorporated herein by reference.

FIELD

The invention relates to a technical field of spectrum analysis, and relates to a Fourier transform spectrometer. An interferometer and a light source in the Fourier transform spectrometer are replaced by an area array composed of a coherent light source.

BACKGROUND

A Fourier transform spectrometer (FTR Spectrometer) generally has the following components: a light source, aperture, beam splitter, fixed mirror, precision-controlled moving mirror, sample chamber, detector, various reflectors, control circuit boards and amplifier circuits. The core component of a Fourier transform spectrometer is an interferometer. Main components in the interferometer are a fixed mirror, a moving mirror, and mechanical components that precisely control the movement of the moving mirror in a certain way. The movement of the moving mirror changes the optical path between the moving mirror and the fixed mirror. The intensity is the highest when the movement of the moving mirror makes the signal received by the detector change continuously with the optical path difference, that is, the interferogram is obtained, and the final spectral diagram can be obtained from the interferogram through Fourier transform.

Existing Fourier transform spectrometers mainly rely on mechanical components to change the optical path difference of the light beam between the moving mirror and the fixed mirror for spectrum measurement. The mechanical parts may increase the volume of the Fourier transform spectrometer, which may limit portability of the Fourier transform spectrometer. Therefore, Fourier transform spectrometers are often limited to be used in laboratories. In addition, mechanical components may cause signal fluctuations during use, affecting the repeatability and accuracy of tests. Therefore, in order to prevent signal fluctuations caused by mechanical components, the interferometers of existing Fourier transform spectrometers are often required to be precisely to ensure the precise movement of the moving mirror and keep the moving mirror parallel to the fixed mirror during the movement process. Precision designed mechanical components can make the existing Fourier transform spectrometer very expensive. In addition, light emitted by the light source has to pass through several mirrors before entering the interferometer, which further increases the volume and cost of the spectrometer.

Therefore, it will be of great significance to design a Fourier transform spectrometer with a smaller volume and lower cost.

BRIEF DESCRIPTION OF THE DRAWINGS

In order to illustrate the technical solutions of the embodiments of the present application more clearly, the accompanying drawings in the embodiments will be briefly introduced below. It should be understood that the following drawings only show some embodiments of the present application, and therefore should not be seen as limiting the scope. For one of ordinary skill in the art, other related drawings can also be obtained from these drawings without any creative work.

Implementations of the present technology will now be described, by way of embodiments, with reference to the attached figures, wherein.

DETAILED DESCRIPTION

Figure 1:
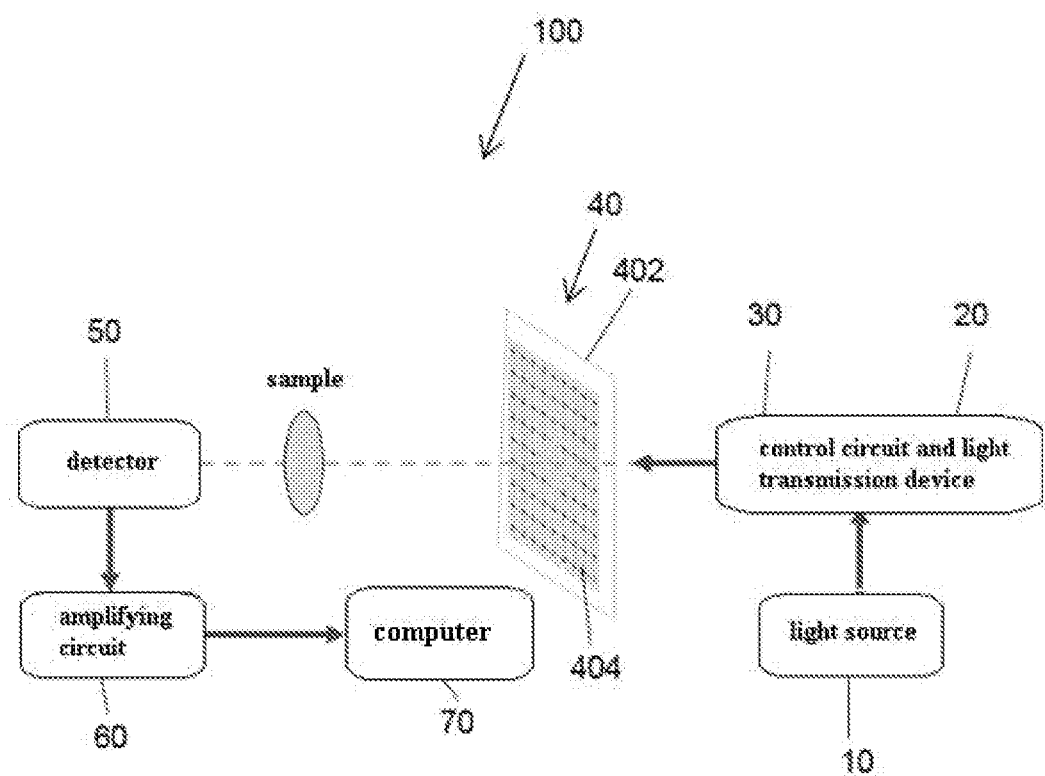
FIG. 1 is a schematic diagram of a Fourier transform spectrometer applicable in an array of coherent light sources provided by an embodiment of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated better illustrate details and features. The description is not to be considered as limiting the scope of the embodiments described herein.

The term "outside" refers to a region that is beyond the outermost confines of a physical object. The term "inside" indicates that at least a portion of a region is partially contained within a boundary formed by the object. The term "substantially" is defined to essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series, and the like. It should be noted that references to "an" or "one" embodiment in this disclosure are not necessarily to the same embodiment, and such references mean at least one.

Please refer to FIG. 1, the present invention provides a Fourier transform spectrometer 100 based on a coherent light source array (hereinafter referred to as the Fourier transform spectrometer 100 according to one embodiment. The Fourier transform spectrometer 100 includes a light source 10, a light transmission device 20, a control circuit 30, a coherent light source array 40, a detector 50, an amplifying circuit 60, and a computer 70.

The light source 10 is preferably but not limited to a laser. In this embodiment, the light source 10 is an infrared laser. Of course, the light source 10 is not limited to the infrared laser in this embodiment, and may also be laser in other wavelength bands.

The light transmission device 20 is fixed on the light source 10 at the beginning and fixed on the coherent light source array 40 at the end. The light transmission device 20 is used to transmit the light emitted by the light source 10 to the coherent light source array 40. In this embodiment, the light transmission device 20 is an optical fiber.

The control circuit 30 is electrically connected with the light transmission device 20 and is used for precisely controlling the on-off of the light in the light transmission device 20. The control circuit 30 can be further designed as a control circuit board.

The coherent light source array 40 includes a substrate 402 and a plurality of light source pixels 404. The plurality of light source pixel points 404 are disposed on the substrate 402. The plurality of light source pixels 404 are disposed on a same surface or two opposite surfaces of the substrate 402. The plurality of light source pixels 404 are coherent light source pixels. The number, spacing and arrangement of the plurality of light source pixel points 404 can be designed according to actual needs. In this embodiment, the coherent light source array 40 is a one-sided coherent light source array, and the plurality of light source pixels are located on the same surface of the coherent light source array 40 and arranged in a matrix shape on the surface of the substrate 402.

The substrate 402 is used to fix the plurality of light source pixel points 404. In some embodiments, the substrate 402 is a transparent substrate, for example, a PET substrate, a PI substrate, a PMMA substrate, quartz glass, and the like. In other embodiments, the substrate 402 is an opaque grid. Certainly, the substrate 402 is not limited to the above-mentioned embodiments, as long as the plurality of light source pixel points 404 can be fixed.

A distribution shape of the light source pixel points 404 is not limited, and can be a rectangle, a circle, a rhombus, and the like. In this embodiment, the distribution of the light source pixel points 404 is a circle, and distances from the points on the circle to the center of the test area are the same, which can make the control circuit 30 of the light source pixel points 404 easier to design.

Figure 2:
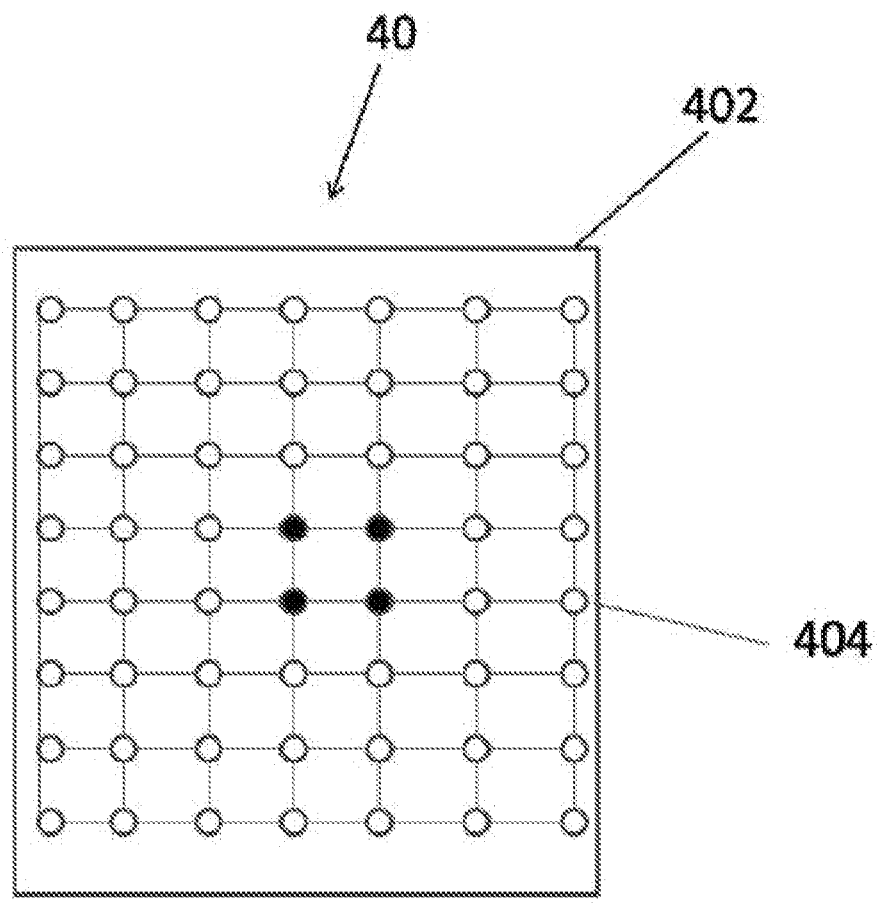
FIG. 2 shows a luminescence situation at a certain moment of the coherent light source array of the Fourier transform spectrometer provided by the embodiment of the present invention.

The on-off of the light source at each pixel in the coherent light source array 40 at different times can be controlled by designing precise programs, to obtain beams with different optical paths. The optical path is a distance from the pixel point of different light sources to the center of the sample. For example, in some embodiments, the light source on each pixel point in the coherent light source array 40 is addressed and its distance from the sample center is recorded and marked, and the light source pixel points with the same distance to the sample center are marked as the same group. Preferably, the distances from adjacent groups of light source pixels to the center of the sample form an arithmetic progression, which is analogous to the movement of a moving mirror in an interferometer. The lighting time of adjacent groups of light source pixels is also preferably in an arithmetic sequence. In this way, light beams with different optical path differences can be obtained, and the optical path difference is the difference from the pixel point of different light sources to the center of the sample. It can be understood that, the method of controlling the on-off of the light source at each pixel point in the coherent light source array 40 at different times by designing a precise program is not limited to the above-mentioned embodiments, and other programs can also be designed for control according to the implementation situation. On the plane of the coherent light source array 40, the light source pixels are grouped according to the optical path into an arithmetic sequence. The optical path difference formed between different groups of light source pixel points is designed to be a multiple of a small optical path difference, which is analogous to the movement of the moving mirror in the Fourier transform infrared spectrometer, which causes the two beams of light generated in the interferometer to form a series of optical path differences. In some embodiments, the small optical path difference is greater than 0 mm and less than or equal to 2 mm. In other embodiments, the small optical path difference can be 2 mm, 1 mm, and so on. Likewise, the design of the optical path difference is not limited to the above method, and can be designed according to specific conditions. Please refer to FIG. 2, in the coherent light source array 40, the solid dots are a group of light source pixel points that are lit at a certain moment, and then, there will be a group of light source pixel points that are lit up, and by analogy, multiple light beams with different optical path differences can be obtained. The light beams formed by different groups of light source pixels hit the sample, which can make the light intensity change continuously with the optical path difference. Using a circuit to control the coherent light source array 40 avoids signal fluctuations caused by mechanical components of the interferometer in existing Fourier transform spectrometers, thereby causing a decrease in the repeatability of test results and ultimately improving the stability of the Fourier transform spectrometer.

The detector 50 is used to detect the light intensity of light beams with different optical path differences after passing through the sample, to obtain an interference pattern. The detector 50 can be a commonly used detector in an existing Fourier transform spectrometer, for example, titanium triglyceride sulfate (TGS), barium strontium niobate, mercury cadmium telluride, indium antimonide, indium gallium arsenide, and the like.

The amplifying circuit 60 is connected with the detector 50 for recording and amplifying the photoelectric signal obtained by the detector 50. The amplifying circuit 60 can be further designed as an amplifying circuit board.

The computer 70 is connected with the amplifying circuit 60, and a spectral analysis software is installed in the computer 70, and the interferogram is Fourier-transformed by using the spectral analysis software, and the interference signal diagram is directly transformed to obtain the spectrogram of the sample. The model of the computer 70 is not limited, as long as it can be installed with spectral analysis software that can perform Fourier transform.

When the Fourier transform spectrometer 100 is in use, the light source 10 emits a laser beam, and the laser beam is transported to the coherent light source array 40 through the light guide device 20. By controlling the on-off of the light source on each pixel point at different times, multiple beams with different optical path differences are generated; the multiple beams pass through the sample and hit the detector 50, and the detector 50 detects the light intensity of the beams with different optical path differences after passing through the sample, and then obtains an interferogram; the interferogram is recorded and amplified by the amplifying circuit 60, and then transmitted to the computer 70; finally, the spectrum software on the computer 70 performs Fourier transform on the interferogram to obtain the spectrogram of the sample.

According to the different wavelength bands of the light beams emitted by the light source 10, the Fourier transform spectrometer 100 can obtain spectral images of samples in different wavelength bands. In this embodiment, the laser beam is an infrared laser beam, and what the Fourier transform spectrometer 100 obtains is an infrared spectrogram of the sample.

The Fourier transform spectrometer based on the coherent light source array provided by the present invention uses a coherent light source array on the same plane to replace the interferometer and the light source, which directly reduces the increased volume of the mechanical components in the interferometer and the reflection mirror between the light source and the interferometer, and can very effectively reduce the volume of the Fourier transform spectrometer. The present invention adopts the coherent light source array of the circuit control surface, avoids the signal fluctuation caused by the mechanical parts of the interferometer, further causes the repeatability decrease of the test result, and finally improves the stability of the Fourier transform spectrometer. Compared with the conventional three-dimensional structure of the interferometer, the precision of the surface coherent light source array of the present invention is reduced by one dimension. At the same time, using a circuit to realize the on-off of the optical path is more operable and repeatable than using a circuit to realize the precise movement of mechanical parts, thereby improving the stability of the system. The invention adopts the surface coherent array light source, which can greatly reduce the cost of the Fourier transform spectrometer and make the use more portable.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

Depending on the embodiment, certain of the steps of methods described may be removed, others may be added, and the sequence of steps may be altered. The description and the claims drawn to a method may comprise some indication in reference to certain steps. However, the indication used is only to be viewed for identification purposes and not as a suggestion for ordering the steps.

What is claimed is:

1. A Fourier transform spectrometer applicable in an array of coherent light sources, comprising:
   a light source;
   a light transmission device comprising a start end and a terminal end;
   a control circuit electrically connected to the light transmission device, the control circuit configured for controlling switching the light transmission device on or off;
   a detector configured to obtain a photoelectric signal emitted by a sample when a light beam is projected through the sample;
   an amplifying circuit connected to the detector, wherein the amplifying circuit records and amplifies the photoelectric signal obtained by the detector;
   a computer coupled with the amplifying circuit, wherein a spectral analysis software is installed in the computer; and
   the array of coherent light sources, wherein the start end of the light transmission device is fixed on the light source, and the terminal end of the light transmission device is fixed on the array of coherent light sources, and the light transmission device is configured to transmit light emitted by the light source to the array of coherent light sources, the array of coherent light sources comprises a substrate and a plurality of light source pixel points, and the plurality of light source pixel points are arranged on the substrate, the plurality of light source pixel points is located on a surface of the coherent light source array, the coherent light sources in the array are arranged on a plane, the plurality of light source pixel points are grouped according to different optical path differences, and the optical path differences formed between different groups of the plurality of light source pixel points are designed to be a multiple of a small optical path difference.

2. The Fourier transform spectrometer of claim 1, wherein the array of coherent light sources comprises surface coherent light sources.

3. The Fourier transform spectrometer of claim 1, wherein switching on or off of the coherent light sources in the array of coherent light sources is individually controlled by a program.

4. The Fourier transform spectrometer of claim 1, wherein the array of coherent light sources comprises a first group of light source pixel points and a second group of light source pixel points, the first and the second groups of light source pixel points are turned on at different time points, thereby obtaining multiple light beams with different optical paths.

5. The Fourier transform spectrometer of claim 1, wherein shapes of the plurality of light source pixels points are circular.

6. The Fourier transform spectrometer of claim 1, wherein the light source is a laser.

7. The Fourier transform spectrometer of claim 1, wherein the light transmission device is an optical fiber.

* * * * *